UNITED STATES PATENT OFFICE.

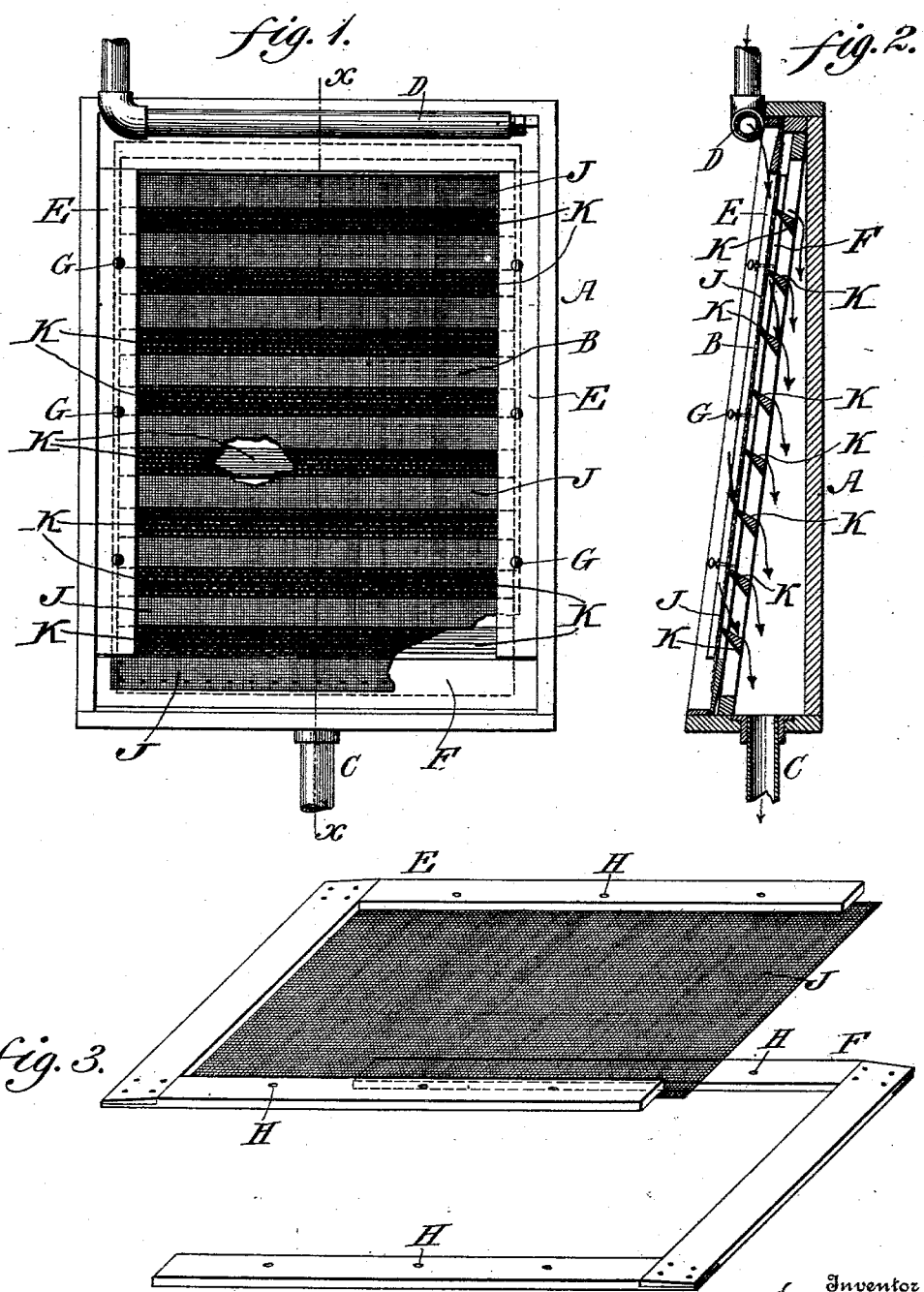

MAURICE W. PHILLIPS, OF PHILADELPHIA, PENNSYLVANIA, ASSIGNOR, BY MESNE ASSIGNMENTS, TO THE PENNSYLVANIA CLAY COMPANY, A CORPORATION OF NEW JERSEY.

APPARATUS FOR SEPARATING COARSE AND FINE PARTICLES OF CLAY, &c.

SPECIFICATION forming part of Letters Patent No. 715,212, dated December 2, 1902.

Original application filed July 1, 1901, Serial No. 66,621. Divided and this application filed October 2, 1901. Serial No. 77,320. (No model.)

*To all whom it may concern:*

Be it known that I, MAURICE W. PHILLIPS, a citizen of the United States, residing in the city and county of Philadelphia, State of Pennsylvania, have invented a new and useful Improvement in Apparatus for Separating Coarse and Fine Particles of Clay and other Insoluble Materials, of which the following is a specification.

My invention consists of an apparatus for treating insoluble materials, such as clay, for the purpose of separating the coarse and fine particles thereof, the same being a division of my application for patent filed July 1, 1901, Serial No. 66,621.

It also consists of novel details of construction, all as will be hereinafter set forth.

Figure 1 represents a front elevation of an apparatus embodying my invention. Fig. 2 represents a sectional view on line $xx$, Fig. 1. Fig. 3 represents a perspective view of the screen, showing the frame thereof taken apart.

Similar letters of reference indicate corresponding parts in the figures.

In the drawings, A designates a box which is open at one side and over which open side extends an upright screen B, suitably secured in place. At the lower end of the box is an outlet C for the discharge of the material passing through the screen, while on the outside of the screen, at the upper end thereof, is a supply-pipe D, extending transversely across the box and provided with suitable openings to direct the material upon the screen.

The object of my invention is to separate the particles of insoluble materials, such as clay, to obtain a finer product than has heretofore been obtainable, as far as I am informed, even when employing a screen of the finest mesh obtainable or in the market. To accomplish this object, I employ a screen B, of fibrous material, and feed the material to be screened thereto suspended in water, so that the size of the mesh of the screen is reduced by reason of the expansion of the fiber, due to the absorption of the water. In this way by employing the finest fibrous mesh obtainable I further reduce the size of the mesh and am thus enabled to obtain a finer product. In the treatment of clay, for instance, in separating the fine from the coarse particles the product secured by a screen of the finest mesh obtainable is not suitable for the purpose for which the product I obtain by the employment of my invention is intended, and therefore, for the reason above stated, I further reduce the size of the mesh by employing absorbent fibrous material and feeding the material thereto suspended in water. The said screen B is a fibrous absorbent screen of the kind above referred to, and in the use of my apparatus in separating the coarse particles, such as sand and other deleterious materials, from clay the clay is first finely divided and suspended in water. Then this water and suspended clay is supplied to the pipe D and fed upon the front face of the screen and as the screen is in substantially an upright position passes down over the face thereof. When the size of the mesh has been reduced by the absorption of the water, only the very finest particles of the clay and the water in which it is suspended passes through the screen B, while the other particles pass across the front face thereof. The water and suspended particles of clay passing through the screen are carried off through the pipe C. I have also found that to make the screening operation more efficient the water and suspended clay passing through the screen should be guided away from the rear face of the screen at intervals to prevent the water and suspended clay that pass through the upper portion of the screen from running down and across the entire rear face thereof, which would retard the passage of the water and suspending clay through the lower portions of the screen, and to secure this I employ deflectors K, consisting of strips extending transversely across the rear face of the screen, with their edges contacting with the screen, said strips or deflectors being suitably secured within the box. These strips or deflectors guide the water and suspended clay passing through the screen away from the rear face of the latter, as shown by arrows in Fig. 2, and prevent the retarding of the passage of the water and suspended clay through the lower portion of the screen.

In assembling the parts of the screen the silk or other mesh J is first tacked or otherwise secured to the frame E, as shown in Fig. 3, being secured, as will be seen, only at its sides and at one end, while at the other end it extends beyond the ends of the side pieces. The frame F is then placed against the side of the frame E, with its end piece opposite the unsecured end of the mesh J. This end of the mesh J is then attached to the end piece of the frame F, and said frames are fastened together by the thumb-screws G. When the finely-divided clay or other insoluble material is fed to the upper end of the screen through the discharge-pipe D, the finer particles thereof will pass with the water through the screen and be deflected into the box A, passing off through the pipe C, while the coarse particles, such as sand and other deleterious matter, passing over the front face of the screen, can be led off from the bottom thereof in any suitable manner.

It is obvious that various changes may be made in the construction of the apparatus shown without departing from the scope of my invention, and except in the claims for the specific construction my invention is not limited to the exact construction herein shown and described.

Having thus described my invention, what I claim as new, and desire to secure by Letters Patent, is—

1. In a device for separating particles of insoluble material, a screen of fibrous material of finest mesh, and means for feeding said insoluble material thereto suspended in water whereby the size of the mesh is reduced by absorption of water.

2. In a screening device, a box having an upright screen of fibrous material of finest mesh, a source of supply at the upper end of said screen for feeding the material to be screened thereto suspended in water whereby the size of the mesh is reduced by absorption of water, and an outlet at the lower end of said box.

3. In a screening device, a box open at one side and having an upright screen of fibrous material of finest mesh extending across the open side thereof, a source of supply at the upper end of said screen for feeding the material to be screened thereto suspended in water whereby the size of the mesh is reduced by absorption of water, and an outlet at the lower end of said box.

4. In a screening device, a box having an open side, an upright screen of fibrous material of finest mesh extending across the open side of said box, a transverse supply-pipe at the upper end and on the outside of said screen for feeding the material to be screened thereto suspended in water whereby the size of the mesh is reduced by absorption of water, and an outlet at the lower end of said box and on the opposite side of said screen.

5. In a screening device, a box having an upright screen of fibrous material of finest mesh, a source of supply at the upper end of said screen for feeding the material to be screened thereto suspended in water whereby the size of the mesh is reduced by absorption of water, an outlet at the lower end of said box, and deflectors contacting with the rear face of said screen.

6. In a screening device, a box open at one side and having an upright screen of fibrous material of finest mesh extending across the open side thereof, a source of supply at the upper end of said screen for feeding the material to be screened thereto suspended in water whereby the size of the mesh is reduced by absorption of water, an outlet at the lower end of said box, and deflectors contacting with the rear face of said screen.

7. In a screening device, a box having an upright screen of fibrous material of finest mesh, a source of supply at the upper end of said screen for feeding the material to be screened thereto suspended in water whereby the size of the mesh is reduced by absorption of water, an outlet at the lower end of said box, and means for guiding the liquid and suspended material passing through the screen away from the rear face of the latter at intervals.

8. In a screening device, a box having an upright screen of fibrous material of finest mesh, a source of supply at the upper end of said screen for feeding the material to be screened thereto suspended in water whereby the size of the mesh is reduced by absorption of water, an outlet at the lower end of said box, and deflectors extending at intervals across the rear face of said screen in contact with the rear face of said screen.

9. In a screening device, a box having an upright screen of fibrous material of finest mesh, a source of supply at the upper end of said screen for feeding the material thereto suspended in water whereby the size of the mesh is reduced by absorption of water, an outlet at the lower end of said box, and deflectors extending at intervals across the rear face of said screen with their edges in contact with the latter.

MAURICE W. PHILLIPS.

Witnesses:
P. W. ADLER,
F. J. HILL.